Dec. 13, 1938.    R. H. BOWEN    2,140,182
VARIABLE-PITCH PULLEY
Filed Dec. 12, 1936    2 Sheets-Sheet 1
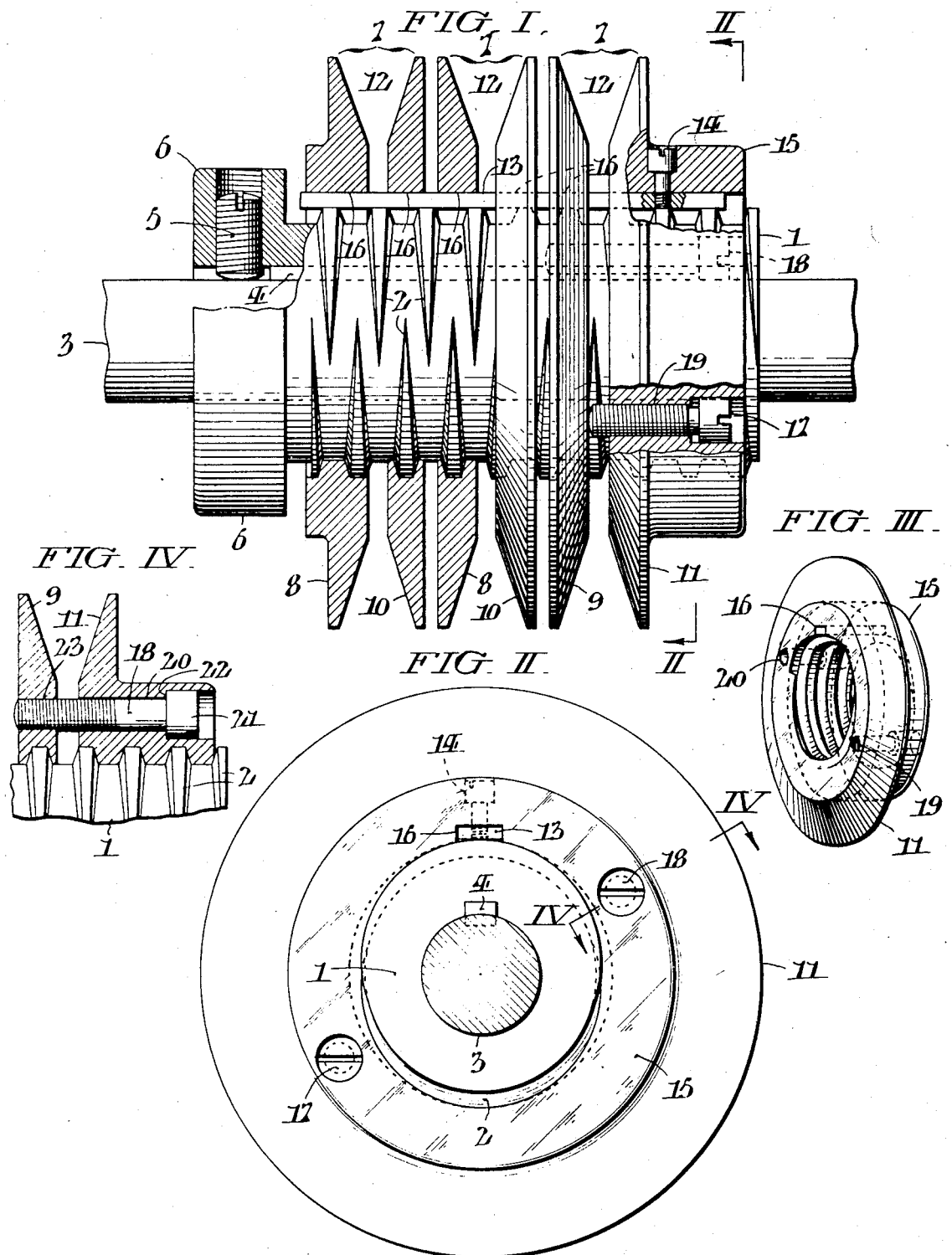
WITNESSES:
Woodrow Stevenson
Stanton W. Kerr
INVENTOR:
Russell H. Bowen,
BY Fraley Paul
ATTORNEYS.

Dec. 13, 1938.  R. H. BOWEN  2,140,182
VARIABLE-PITCH PULLEY
Filed Dec. 12, 1936  2 Sheets-Sheet 2
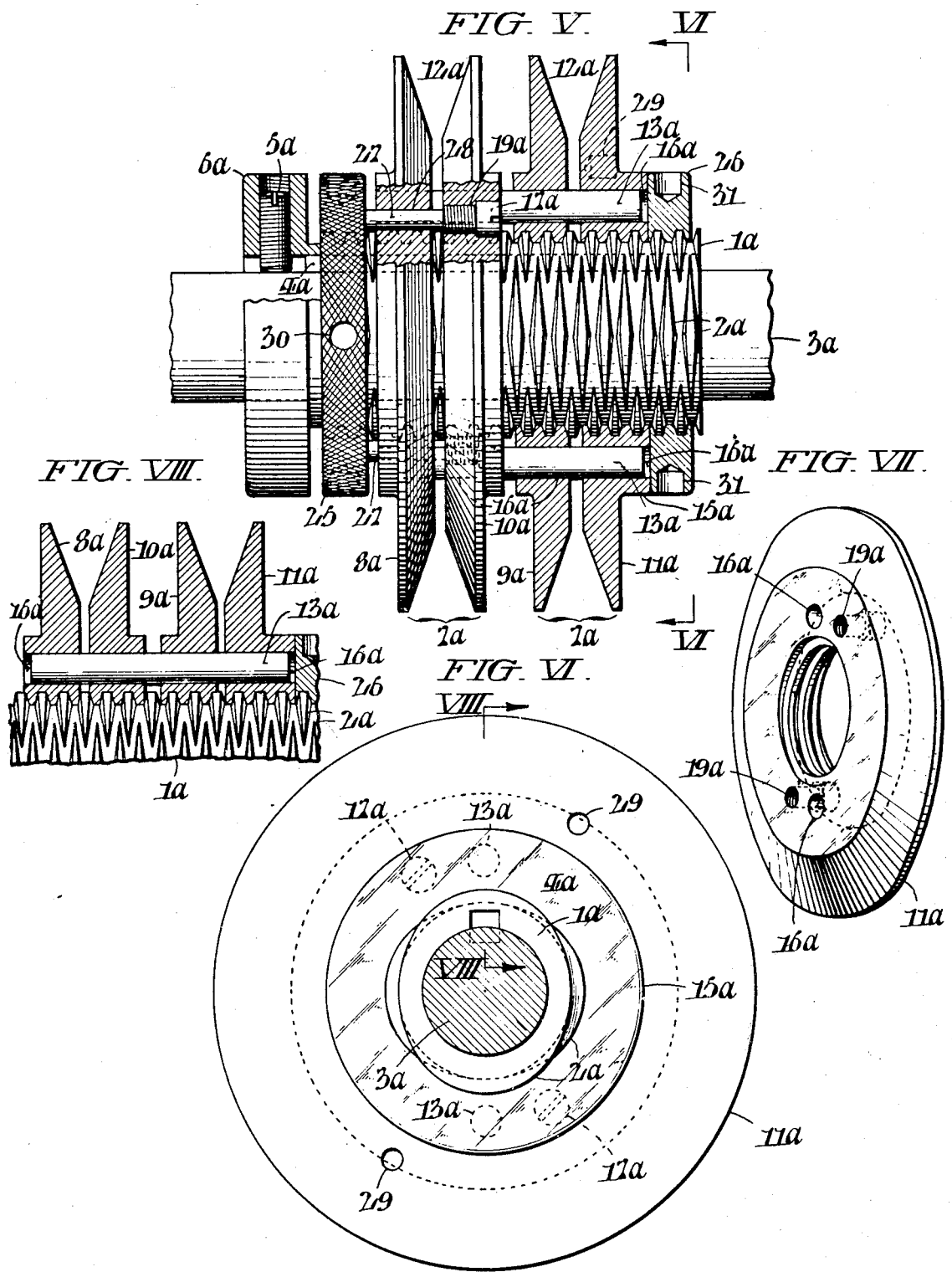
WITNESSES:
INVENTOR:
Russell H. Bowen,
BY
ATTORNEYS.

Patented Dec. 13, 1938

2,140,182

UNITED STATES PATENT OFFICE 2,140,182

VARIABLE-PITCH PULLEY

Russell H. Bowen, Philadelphia, Pa., assignor to The American Pulley Company, Philadelphia, Pa., a corporation of Pennsylvania Application December 12, 1936, Serial No. 115,498

3 Claims. (Cl. 74—230.17)

This invention relates to variable-pitch pulleys and, more particularly, to the type having capacity for changing the effective diameter so as to render possible the transmission of power at different speeds.

The primary object of this invention is to provide a variable-pitch pulley embodying opposed components which can be concurrently moved toward or away from each other to vary the pitch or effective diameter of said pulley, and locked at the required adjustment.

Another object of the invention is to provide a variable-pitch multi-groove pulley embodying counterpart sheave-forming components all of which can be simultaneously moved toward or away from each other to vary the effective diameter of the several grooves without changing the alignment of the belts driven thereby, and then positively locked at the required adjustment against any tendency to spreading or movement closer together of the respective sheave-forming components.

A further object of the present invention is the provision, in a pulley of the types above indicated, of a co-axial rotative means for effecting variation in the pitch diameter thereof.

Other objects and advantages, more or less ancillary to the foregoing, and the manner in which they are realized, will become apparent from a more complete examination of the following description which, considered in connection with the accompanying drawings, sets forth practical coordinations of the inventive features.

Generally stated, this invention consists of the novel items, combinations of means, and arrangements of parts hereinafter disclosed, illustrated by the drawings, and more concisely expressed in the claims at the conclusion hereof.

In the drawings:

Fig. I is a view showing one form of the improved pulley, partly in elevation and partly in section.

Fig. II is an end view looking in the direction indicated by the arrows II—II in Fig. I.

Fig. III is a perspective view on a smaller scale of one of the sheave components of this invention.

Fig. IV is a fragmentary sectional view, taken as indicated by the arrows IV—IV in Fig. II.

Figs. V, VI and VII, are views corresponding to Figs. I, II and III, showing an alternative form of the invention; and, Fig. VIII is a fragmentary sectional view, taken as indicated by the arrows VIII—VIII in Fig. VI.

In the form of this invention featured in Figs. I—IV, the improved pulley includes a sleeve hub member 1 with duplex right and left hand external threads 2, said member being held against rotation on the pulley shaft 3 by means of a spline 4, and secured against shifting axially on said shaft by a set-screw 5 passing through an enlarged head or collar 6 at one end thereof. Mounted on the hub member 1 are a plurality of coaxial sheave units 7 comprising opposing-half or counterpart components 8, 9, and 10, 11 which jointly provide V-grooves 12, for as many individual drive belts (not shown). The sheave components 8, 9 have right-hand internal threads and the sheave components 10, 11 left-hand internal threads, in engagement with the external duplex threads 2 of the hub member 1. A longitudinally extending key 13, secured by a set-screw 14 in the axial boss 15 of the sheave component 11, passes through conformative slots 16 in the other components 8, 9 and 10, thereby connecting said components together and holding them in definite common circumferential relation, but with capacity for simultaneous axial shifting.

As a consequence of the described arrangement, it is possible to concurrently vary the effective diameters of the several sheave units 7 without attendant disaligning of the respectively associated belts, simply by turning the entire assemblage of said units in one direction, or the other, about the hub member 1 incident to which the components 8, 10 and 9, 11 will be moved closer together, or further apart, under the action of the duplex screw threads 2.

In order to prevent accidental displacement of the sheave components 8—11 in adjusted positions by positively preventing relative movement, a pair of stop screws 17, 18 are provided, said screws being preferably carried by the endmost component 11. As shown in Fig. I, the shank of the stop screw 17 threadedly engages a tapped aperture 19 in the component 11 and bears against the companion sheave component 9; while the stop screw 18 is free in a smooth aperture 20, Figs. III and IV, of the component 11, with its head 21 bearing against a shoulder 22 in said aperture 20 and its shank threadedly engaging a tapped hole 23 in the component 9. When tightened, the stop screws 17 and 18 react upon each other and thus bind the components 9, 11 on the thread 2, whereby rotation of all the other units is positively prevented through the medium of the key 13.

In the alternative embodiment of the invention illustrated in Figs. V—VIII, the sheave components 8a, 9a and 10a, 11a, respectively, have left and right-hand internal threads in engagement with external duplex threads 2a of the sleeve hub member 1a on the pulley shaft 3a, said sheave components being, in this case, connected with capacity for shifting axially, by a pair of pins 13a passing through aligned holes 16a in them. Mounted on the hub member 1a, respectively adjacent the outermost sheave components 8a, 11a, are nut collars 25, 26 both having a left-hand internal thread in engagement with the external duplex thread 2a of said hub member. Threadedly engaged in tapped apertures 19a of the sheave component 10a are a pair of screws 17a, whereof the diametrically reduced plain ends 27 pass through smooth apertures 28 in the sheave component 8a and abut the contiguous face of the nut collar 25. To adjust the pulley in this case for variation in the effective diameter of the sheaves 7a, the nut collars 25, 26 are backed-off and the sheave assembly thereupon rotated bodily about the sleeve hub 1a in one direction, or the other, to bring the sheave components 8a—11a either closer together, or further apart. After the desired adjustment has been obtained, the nut collar 26 is brought into jamming relation with the face of the hub 15a of the sheave component 11a, and the nut collar 25 into jamming relation with the shank ends 27 of the screws 17a. Due to the reversed internal threading of the sleeve component 11a and the jamming nut collar 26, said component is locked against the possibility of independent rotation on the hub member 1a. Likewise due to the reversely pitched threads of the sheave component 10a carrying the screws 17a and the nut collar 25, said component is likewise locked against rotation on the hub member 1a. In order to facilitate the adjustment, the sheave component 11a and the nut collars 25, 26 are respectively provided with spanner wrench holes 29, 30 and 31.

While specific embodiments of the invention have been illustrated and described, it is to be understood that alteration in the details of construction may be effected without departing from the spirit and scope of said invention as indicated in the following claims.

Having thus described my invention, I claim:

1. A variable-pitch diameter groove pulley comprising a hub member with external opposing duplex threads, groove-forming side components having internal threads in engagement with the hub member threads, means holding all of said components in definite common relation circumferentially with capacity for simultaneous turning in one direction or the other to effect axial adjustment towards and away from each other, and means for locking the groove-forming components including reactive stop screws, one of which threadedly engages through one of the side components into abutment with the companion component, and the other screw passes freely through the first mentioned component into threaded engagement with the second named component, whereby all of the groove forming components are positively arrested against relative movement.

2. A variable-pitch diameter groove pulley comprising a hub member with external right and left-hand duplex threads, a series of opposing coaxial groove-forming side components having alternately reversed internal threads in engagement with the hub member threads, means holding all of said components in definite circumferential relation with capacity for concurrent rotation in one direction or the other to effect their axial movement toward or away from each other, said means consisting of a longitudinal key secured to one groove-forming side component and passing through conformative slots in the other components, and means for positively locking the groove-forming components, at the requisite adjustment, including a pair of reactive stop screws, one of which threadedly engages through one of the pulley outer components into abutment with the companion component, and the other of said screws passes freely through the first mentioned groove-forming component and threadedly engages in the second named component whereby all of the groove forming components are concurrently bound to the associated hub member thread portions.

3. A variable-pitch groove pulley as defined in claim 2 in which the series of groove-forming components are held in definite circumferential relation by pins fitting aligned holes through said series, nut collars with internal left-hand threads engage the hub member ends, and stop screws threadedly coact with one groove-forming component and pass through smooth apertures in the companion component into jamming abutment with one of the hub end collars.

RUSSELL H. BOWEN.